United States Patent [19]

Smith

[11] Patent Number: 4,510,281

[45] Date of Patent: Apr. 9, 1985

[54] TACK-FREE POLYMER PELLETS

[75] Inventor: Malcolm S. Smith, Orange, Tex.

[73] Assignee: E. I. Du Pont de Nemours and Company, Wilmington, Del.

[21] Appl. No.: 563,231

[22] Filed: Dec. 19, 1983

Related U.S. Application Data

[63] Continuation-in-part of Ser. No. 472,644, Mar. 7, 1983, abandoned, which is a continuation-in-part of Ser. No. 348,012, Feb. 16, 1982, abandoned, which is a continuation-in-part of Ser. No. 267,082, May 26, 1981, abandoned.

[51] Int. Cl.$^3$ .............................................. C08K 5/20
[52] U.S. Cl. .................................................... 524/229
[58] Field of Search ....................................... 524/229

[56] References Cited

U.S. PATENT DOCUMENTS

| | | | |
|---|---|---|---|
| 3,165,492 | 1/1965 | Tholstrup | 524/229 |
| 3,407,162 | 10/1968 | Rundle | 524/229 |
| 3,645,822 | 2/1972 | Widiger | 524/229 |
| 3,969,304 | 7/1976 | Pugh | 524/229 |

*Primary Examiner*—Paul R. Michl
*Attorney, Agent, or Firm*—Paul R. Steyermark

[57] ABSTRACT

Certain N,N'-ethylenebisamides and N,N'-diadipamides added to ethylene/vinyl acetate dipolymers, terpolymers of ethylene with carbon monoxide, copolymers of ethylene with methacrylic acid, copolymers of ethylene with methyl methacrylate, and terpolymers of ethylene with n-butyl acrylate and carbon monoxide remarkably reduce the tendency of polymer pellets to block. Free-flowing copolymer pellets can be handled without blocking and moved more quickly through the packing equipment and can be stored for extended periods without blocking. Copolymer pellets containing these additives can be packed into large containers and shipped without blocking. The preferred additive is N,N'-ethylenebisoleamide.

14 Claims, No Drawings

TACK-FREE POLYMER PELLETS

CROSS-REFERENCE TO RELATED APPLICATION

This is a continuation-in-part of my application Ser. No. 472,644, filed Mar. 7, 1983, abandoned, which was a continuation-in-part of my application Ser. No. 348,012, filed Feb. 16, 1982 and now abandoned, which was a continuation-in-part of my application Ser. No. 267,082 filed May 26, 1981, now abandoned.

BACKGROUND OF THE INVENTION

This invention relates to tack-free polymer pellets, for example, ethylene/vinyl acetate copolymer pellets having good handling and block resistance characteristics.

For the purpose of this invention, the term "vinyl acetate copolymer" includes both the dipolymers and the terpolymers of ethylene with vinyl acetate and with carbon monoxide.

Ethylene/vinyl acetate (EVA) copolymers find wide commercial use in flexible, heat sealable, functional, and decorative hot-melt and solvent-applied coatings; as wax additives to impart toughness, flexibility, and adhesion; as blending resins to impart flexibility to brittle materials; and as a component of hot-melt and solvent-applied adhesives. Most commercial EVA dipolymers contain about 2–55% by weight of vinyl acetate. Terpolymers of ethylene with vinyl acetate and with carbon monoxide may contain about 18–40 weight percent of vinyl acetate and 2–12 weight percent of carbon monoxide. Dipolymers of ethylene with vinyl acetate are available, e.g., from E. I. du Pont de Nemours and Company, Wilmington, Del., under the trademark "Elvax"; the terpolymers with carbon monoxide can be made according to the teachings of U.S. Pat. Nos. 2,495,286 to Brubaker and 3,780,140 to Hammer. As the vinyl acetate content of the copolymer increases, the copolymer tends to become increasingly sticky. Copolymer pellets, the usual commercial form, at the same time increasingly tend to block, that is, to stick together and form large agglomerates, especially at somewhat elevated temperatures and under pressure of their own weight. This stickiness and the resulting blocking also increase with the copolymer's melt index, that is, with decreasing molecular weight. For example, for bulk EVA copolymer containing about 25–80% by weight of vinyl acetate, problems of this nature usually are encountered when the melt index exceeds 6 g/10 min. Yet, even those copolymers will have different flow properties and blocking tendencies, depending on their melt index values. For example, those copolymers having melt indices below about 50 g/10 min can be shipped in 26.6 kg bags or in 500 kg boxes without blocking. Those having melt indices above about 100 g/10 min cannot be shipped in large containers without risk of blocking but can be shipped in bags. Pellets of all these copolymers are free flowing and can be handled without difficulty. Higher vinyl acetate content copolymers, for example, those containing above 35 weight percent of vinyl acetate, are very sticky, have poor flow properties, and block even in regular size bags. Most higher vinyl acetate content EVA copolymers cannot be shipped in hopper cars. Other polymers which present difficulties of similar nature, but especially in shipping and storage, are copolymers of ethylene with methacrylic acid in which the carboxyl groups are either free or partly neutralized with metal ions, copolymers of ethylene with methyl methacrylate, and terpolymers of ethylene with n-butyl acrylate and carbon monoxide. Copolymers of ethylene with methacrylic acid are available from E. I. du Pont de Nemours and Company under the name "Nucrel". The partly neutralized, ionic form polymers (ionomers) are available from the same source under the name "Surlyn". Copolymers of ethylene with methyl methacrylate can be made according to U.S. Pat. Nos. 3,287,335 to Stuetz, 3,658,741 to Knudson et al., and 3,949,016 to Agouri et al. Terpolymers of ethylene with n-butyl acrylate and carbon monoxide can be made following the techniques of the above Brubaker and Hammer patents.

A particularly serious problem, which occurs in the pelletization and packaging equipment handling tacky polymers, especially certain grades of ethylene/vinyl acetate copolymers, is the tendency of the pellets to stick both to themselves and to the equipment, thus slowing down the process flow rate below its optimum value. If the pellets cannot be handled at normal process speeds or cannot be handled at all, the efficiency of the process suffers greatly.

All polymers contemplated by this invention have a tendency to block in storage in pellet form but not all present significant handling difficulties or have poor flow properties. Poor flow properties are indicated by a low "stick temperature", which is determined in a standardized test developed by E. I. du Pont de Nemours and Company and described below. This test measures the tendency of polymer pellets to flow after holdup for a fixed time at a fixed temperature and pressure. The EVA copolymers of interest in the practice of the present invention have a stick temperature of at most about 40° C., while the other polymers of interest have a stick temperature of less than about 60° C. Polymers having stick temperatures above those temperatures do not usually have a tendency to block under normal handling and storage conditions. Various techniques have been proposed to improve the flow properties of EVA copolymer pellets and to reduce their tendency to block, especially, coating the pellets with various materials such as clay, talc, or powdered polyethylene. See, for example, U.S. Pat. No. 3,528,841 to Donaldson et al. These methods are effective in varying degrees but have a shortcoming in that they do not always completely eliminate agglomeration of the pellets, which may occur before the coating is applied; and, further, the coating may not remain indefinitely attached to a pellet but may be lost in part in normal handling.

Slip (anti-tack) agents are offered commercially to improve the slip of polymer films and polymer processability. These include, for example, various fatty acid amides, which for the most part have been found to be ineffective or only marginally effective in reducing the tendency of EVA pellets to block but are quite effective in certain polymers of other types.

SUMMARY OF THE INVENTION

It has now been discovered that the blocking tendency of pellets of polymers selected from the group consisting of (a) copolymers of ethylene with vinyl acetate containing about 18–55 weight percent of vinyl acetate, (b) terpolymers of ethylene with vinyl acetate and carbon monoxide containing about 20–40 weight percent of vinyl acetate and 3-12 weight percent of carbon monoxide, (c) copolymers of ethylene with methacrylic acid containing about 6-30 weight percent of methacrylic acid, wherein the carboxyl groups are neutralized with zinc ions to the extent of 0 to about 50%, (d) copolymers of ethylene with methyl methacrylate containing about 18-40 weight percent of methyl methacrylate, and (e) terpolymers of ethylene with n-butyl acrylate and carbon monoxide containing about 20-40 weight percent of n-butyl acrylate and 3-15 weight percent of carbon monoxide, wherein the stick temperature of copolymers of ethylene with vinyl acetate is at most about 40° C., while the stick temperature of the other polymers is less than about 60° C., can be significantly reduced or the free-flowing properties of the pellets can be significantly improved by incorporating into the polymer material prior to pelletization about 500-10,000 parts per million (ppm), especially 1000-5000 ppm, based on the polymer weight of an additive selected from the group consisting of N,N'-ethylenebisoleamide, N,N'-ethylenebiserucamide, N,N'-diolelyladipamide, and N,N'-dierucyladipamide.

For the purpose of this invention (the term "oleyl" means cis-9-octadecenyl, $C_8H_{17}CH=CH(CH_2)_7CH_2-$; and the term "erucyl" means cis-13-docosenyl, $C_8H_{17}CH=CH(CH_2)_{11}CH_2-$. This nomenclature is generally used in the trade, for example, for oleyl alcohol, oleylamine, and erucylamine.

DETAILED DESCRIPTION OF THE INVENTION

N,N'-Ethylenebisoleamide,

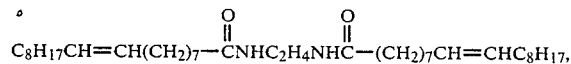

the preferred additive, is available commercially from Carstab Corp. in Reading, Ohio, under the name "Advawax" 240; from Humko Sheffield Co., Memphis, Tenn., under the name "Kemamide" W-20; and from Glyco Chemical Co., Greenwich, Conn. under the name "Glycolube" VL. The commercial product has a melting range of 113°-118° C. and is difficultly soluble in most commercial solvents. It is recommended by its manufacturers as processing lubricant and antiblocking agent for various polymers and copolymers, especially as a slip agent for films. Its recommended level is 0.5-2%. The other additives can be made by known methods from readily available materials. Thus, N,N'-ethylenebiserucamide is made by heating 1,2-ethylenediamine with erucic acid, and the remaining two amides are made by heating either adipic acid or its dimethyl ester with at least two equivalents of either oleylamine or erucylamine. The adipamide thus has the formula

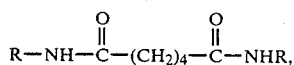

where R is either the oleyl or the erucyl group.

It is believed that the additives of this invention have a particular ability to migrate within the polymer pellets to the surface or "bloom". The resulting layer of additive on the pellet surface is responsible for the improvement of pellet properties, but all four additives do not migrate at the same rates. It has been found that N,N'-ethylenebisoleamide migrates to the surface of EVA copolymer pellets nearly instantaneously, while for N,N'-ethylenebiserucamide the rate of migration is much slower. N,N'-ethylenebisoleamide thus is truly outstanding in its effectiveness both to reduce blocking and to improve handling and free flow properties. However, when time is not a critical consideration, all four additives are very effective.

The effectiveness of an antiblocking agent can be estimated in various manners, although the best test naturally is actual storage over an extended period. One also may judge the feel of pellets made from a polymer, which should be slippery, rather than tacky. Stick temperature is the most useful laboratory measurement for EVA copolymers having about 25-30% of vinyl acetate as well as for most other polymers. Although a low stick temperature does not always mean that pellets will have a tendency to block, a high (e.g., more than 60° C.) stick temperature normally suggests that the pellets will not have such tendency. Such high stick temperature polymers include, for example, polyethylene (over 70° C.) and ethylene/vinyl acetate copolymers of low melt index and/or low vinyl acetate content, such as:

| Wt % VA | Melt Index | Stick temp., °C. |
|---------|-----------|------------------|
| 8.4 | 1.8 | >70 |
| 12 | 0.35 | 70 |
| 15 | 8 | 61 |

For high vinyl acetate content copolymers and other sticky copolymers a laboratory blocking test has been devised because the stick temperature of those polymers is so low that a meaningful value cannot be obtained. Improvement of the handling and packaging throughput in actual production also is an excellent indication of good slip properties, especially for these higher vinyl acetate content copolymers.

The amides of this invention can be added to the copolymers by any convenient technique, for example, in the melt, as a dry powder below its melting temperature, or as a concentrate in the same or any compatible polymer. The additive is thoroughly blended with the polymer, and then the polymer is extruded into pellets. It is preferred to use the additive at a level of 1000-5000 ppm, especially 2000-4000 ppm because at lower levels the improvement in slip properties may not be sufficiently attractive, while at higher levels other properties, for example, the adhesive properties of the copolymer may be adversely affected.

It has been found that pellets of copolymers of ethylene with vinyl acetate of varying vinyl acetate contents and melt indices containing 3500 ppm of N,N'-ethylenebisoleamide could be stored for several months and shipped in bulk in insulated hopper cars.

EVA copolymers sometimes are formulated with a small amount, up to about 13%, of wax, especially paraffin wax. Addition of an amide of this invention to such wax-containing EVA copolymer also improves its resistance to blocking. The amount of the additive is, as before, based on the weight of the EVA copolymer.

While the additives of this invention have the unique ability of reducing blocking and improving the free-flowing properties of pellets of specific polymers recited in this specification and in the claims, they are also effective in various other polymers. However, pellets of various other polymers can also often be improved by the addition of standard prior art slip agents, such as, e.g., stearamide or N,N'-ethylenebisstearamide, which are much less effective in pellets of the polymers envisaged by the present invention.

This invention is now illustrated by the following examples of certain representative embodiments thereof, where all the parts, proportions, and percentages are by weight. All the blends were prepared in an extruder and underwater melt cut to pelletize the product.

The rate of migration of two of the additives of this invention to the pellet surface was determined as follows: a sample, 100–200 g of pellets freshly cut underwater at a temperature of about 10°–15° C. was centrifuged in a wire basket for 30 seconds to spin-dry the pellets. The centrifuge was allowed to come to a stop; the wire basket was removed and turned upside down. From the instant the pellets were cut to that point, the total time was under 2.5 minutes. An ethylene/vinyl acetate dipolymer containing about 40% of vinyl acetate without additive did not fall out of the basket, but a sample containing 1000 ppm of N,N'-ethylenebisoleamide was free-flowing. For the same concentration of N,N'-ethylenebiserucamide, the migration time to achieve free-flow of the pellets from the basket was 45 minutes. At the 3000 ppm level, both the bisoleamide- and the bis-erucamide-containing pellets were free-flowing as soon as the wire basket was removed. Similarly, an ethylene/vinyl acetate/carbon monoxide terpolymer containing 28% of vinyl acetate and 9% of carbon monoxide (melt index of 35 g/10 min) was not free-flowing without an additive. A sample containing 4000 ppm of N,N'-ethylenebisoleamide was free-flowing as soon as the wire basket was removed and turned upside down. When N,N'-ethylenebiserucamide was used instead, the additive migration time was 30 minutes.

The stick temperature is defined as the maximum temperature at which all the polymer pellets empty from the test apparatus in less than one minute following holdup under fixed conditions.

Polymer pellets are placed in a vertical tube having inside diameter of 3.9 cm and length of 23.2 cm lined loosely with a 5-mil (0.13 mm) thick film of poly(ethylene terephthalate) (Mylar ®500D, Du Pont Co.). A 4086 g weight is placed on top of the pellets, so that the downward pressure is 33.5 kPa. Hot air is passed upward through the pellets at 11 cm$^3$/min for 15 min; then air at ambient temperature is passed at 11 cm$^3$/min for 5 min. The weight is then removed, and the tube is inverted. Time during which all the pellets flow out of the tube is noted. The test is repeated at gradually increasing temperatures until a point is reached when only a portion of the copolymer pellets or none of the pellets flow out of the tube. The stick temperature is the last temperature at which all the pellets flowed out in less than one minute.

The stick temperature of a given copolymer will to some extent depend on the size and shape of the pellets. Smaller, nonspherical pellets block more readily than larger, spherical pellets. Therefore, it is important to run a control experiment for each stick temperature determination. All the pellets used in the examples below weighed 1.8–3.2 g per 100 pellets and were "pillow"-shaped.

In addition, the stick temperature is affected by other factors, such, for example, as the particular pelletizing technique and equipment and subsequent handling. Thus, the stick temperature of commercial pellets of a given polymer will usually be higher than that of laboratory-made pellets of the same polymer. All the pellets used in Examples 1–17 were made in the laboratory by repelletizing additive-free commercial polymer pellets.

EXAMPLE 1

A 5% concentrate of N,N'-ethylenebisoleamide in an EVA dipolymer containing 28% of vinyl acetate and having a melt index of 150 g/10 min was prepared by melting the EVA dipolymer in a kettle at 220° C. under nitrogen and adding the required amount of the bisoleamide. The concentrate was heated with occasional stirring until homogeneous, poured into a slab, and ground.

Blends of EVA dipolymer having a melt index of 150 g/10 min and 28% of vinyl acetate with the above concentrate, which contained 1000, 2000, and 3000 ppm of the bisoleamide were prepared and pelletized. They had a definite slippery feel.

The following stick temperatures were obtained:

| EVA copolymer control | 30.1° C. |
| --- | --- |
| 1000 ppm blend | 36.7° C. |
| 2000 ppm blend | 36.5° C. |
| 3000 ppm blend | 40.7° C. |

EXAMPLE 2

EVA dipolymers having melt indices, respectively, of 150, 43, and 25 g/10 min and a vinyl acetate content of 28%, each was blended with the bisoleamide/EVA concentrate of Example 1 to give bisoleamide concentrations of 3000, 4000, and 5000 ppm and pelletized as before. All these blends had a slippery feel, which the control EVA copolymers did not have.

The following stick temperaturs were obtained for the 3000 ppm blends and for the control copolymers:

| EVA dipolymer | stick temperature | |
| --- | --- | --- |
| melt index | control | blend |
| 150 | 32° C. | 34° C. |
| 43 | 30° C. | 36° C. |
| 25 | 30° C. | 38° C. |

EXAMPLE 3

Blends of EVA dipolymer having a melt index of 150 g/10 min and containing 28% of vinyl acetate with the N,N'-ethylenebisoleamide/EVA concentrate of Example 1 to give, respectively, 3000 and 5000 ppm of the bisoleamide were prepared. All had the slippery feel, but their stick temperatures were close to the stick temperature of the control copolymer. Six samples containing three commercial N,N'-ethylenebisstearamides at the same levels also were prepared. They did not have a slippery feel, and their stick temperatures also were close to the controls. It is possible that a weighing error was made in the case of the bisoleamide, so that the actual amount of this additive was less than intended.

EXAMPLE 4

A 25% concentrate of N,N'-ethylenebisoleamide in EVA dipolymer having a melt index of about 57 g/10 min and a vinyl acetate content of about 40% was prepared.

EVA dipolymer having a melt index of about 57 g/10 min and a vinyl acetate content of about 40% was blended with the above 25% concentrate to give a homogeneous blend containing 5000 ppm of the bisoleamide. Samples, 908 g each, of this blend, of re-extruded EVA dipolymer, and of commercial, clay-coated EVA dipolymer having the same melt indices and vinyl acetate concentrations were air dried for 16 hr at 40° C. The bisoleamide-containing sample flowed freely from a small bag; the other two samples were severely blocked.

EXAMPLE 5

Samples, 9.08 kg each, of EVA dipolymer having a melt index of about 57 g/10 min and containing about 40% of vinyl acetate were prepared. They contained, respectively, 1000, 3000, and 5000 ppm of N,N'-ethylenebisoleamide. Each sample was placed in a bag under four bags of EVA copolymer (106.6 kg total) and checked from time to time to determine if it was free flowing. After 15 months, all samples still were free flowing. This performance is quite remarkable because the untreated copolymer is very soft and sticky and blocks in a matter of hours under these conditions.

EXAMPLE 6

EVA dipolymer (28% of vinyl acetate and melt index of 150 g/10 min) samples containing 3000 and 5000 ppm samples of commercial anti-tack additives were prepared. The samples containing two commercial N,N'-ethylenebisoleamides, "Advawax" 240 and "Glycolube" VL, had a slippery feel. Their stick temperatures were 34°–35° C., compared with untreated EVA copolymer control's stick temperature of 30.1°–33.5° C. Samples containing three commercial makes of N,N'-ethylenebisstearamide, "Advawax" 275, 280, and 290 (Carstab Corp.), "Kemamide" W-40 (HumKo Sheffield Co., Memphis, Tenn.), and "Acrowax" C (Glyco Chemical Co., Greenwich, Conn.); oleamide, "Kemamide" U; and two materials of unknown composition, "Paricin" 285 (NL Industries, New York, N.Y.), and "Rosswax" (Frank B. Ross Co., Jersey City, N.Y.) were not slippery to the touch (did not bloom), and their stick temperatures were 29°–31° C.

EXAMPLE 7

EVA dipolymer having a melt index of 43 g/10 min and containing 33% of vinyl acetate and EVA dipolymer having a melt index of 400 g/10 min and containing 28% of vinyl acetate, each also containing, respectively, 1000, 3000, and 5000 ppm of N,N'-ethylenebisoleamide had a slippery feel, and their stick temperatures were moderately increased, as shown:

| EVA Copolymer Vinyl Acetate, % | bisoleamide ppm | Stick Temp. °C. |
|---|---|---|
| 33 | — | 26 |
|  | 1000 | 29 |
|  | 3000 | 31 |
|  | 5000 | 31 |
| 28 | — | 25 |
|  | 1000 | 30 |
|  | 3000 | 30 |
|  | 5000 | 31 |

EXAMPLE 8

An industrial batch, 18160 kg, of EVA copolymer having a melt index of 57 g/10 min and containing 40% of vinyl acetate blended with N,N'-ethylenebisoleamide to a level of 4000 ppm of the bisoleamide was prepared and pelletized. It was found that N,N'-ethylenebisoleamide migrated to the surface of the pellets and formed a protective coating in a matter of seconds. These coated pellets could be transferred, purged and blended without blocking, and their transfer rate was about 20% higher than that of clay-coated pellets. They continued to flow freely after 6 weeks at 32° C. Clay-coated copolymer pellets block in less than B 30 days under these conditions.

EXAMPLE 9

A plant run copolymer containing 90% of ethylene and 10% of methacrylic acid (melt index of 500 g/10 min) was blended with the indicated amounts of test amides. The compositions and stick temperatures of the samples are given in the table below. It can be seen that N,N'-ethylenebisoleamide provides a meaningful increase of stick temperature.

| Additive (ppm) | Stick Temp., °C. |
|---|---|
| Control | 46 |
| 5000 erucamide | 43 |
| 5000 stearamide | 48 |
| 5000 N,N'—ethylenebisstearamide | 48 |
| 1000 N,N'—ethylenebisoleamide | 49 |
| 5000 N,N'—ethylenebisoleamide | 55 |

EXAMPLE 10

The same test was performed with an ethylene/methacrylic acid copolymer containing 15% of methacrylic acid. Again, N,N'-ethylenebisoleamide provided a significant increase of stick temperature, as can be seen from the following table:

| Additive (ppm) | Stick Temp., °C. |
|---|---|
| Control | 34 |
| 5000 erucamide | 36 |
| 5000 stearamide | 42 |
| 5000 N,N'—ethylenebisstearamide | 42 |
| 1000 N,N'—ethylenebisoleamide | 34 |
| 5000 N,N'—ethylenebisoleamide | 47 |

EXAMPLE 11

The same test was performed with an ethylene/methacrylic acid copolymer containing 15% of methacrylic acid and 20% neutralized with $Zn^{++}$ ions. The copolymer had a melt index of 12 g/10 min. Here again, the most significant improvement of stick temperature was obtained with N,N'-ethylenebisoleamide. The experimental results are provided in the table below.

| Additive (ppm) | Stick Temp., °C. |
| --- | --- |
| Control | 30 |
| 5000 erucamide | 31 |
| 5000 stearamide | 40 |
| 5000 N,N'—ethylenebisstearamide | 41 |
| 1000 N,N'—ethylenebisoleamide | 40 |
| 5000 N,N'—ethylenebisoleamide | 48 |

EXAMPLE 12

A similar test was performed with an ethylene/methyl methacrylate copolymer containing 20% of methyl methacrylate. Its melt index was 3.2 g/10 min. The results are tabulated below.

| Additive (ppm) | Stick Temp., °C. |
| --- | --- |
| Control | 53 |
| 5000 erucamide | 55 |
| 5000 stearamide | 52 |
| 5000 N,N'—ethylenebisoleamide | 60 |

EXAMPLE 13

A similar test was performed with a terpolymer of ethylene with vinyl acetate (28%) and carbon monoxide (9%), which had a melt index of 35 g/10 min. The results are given in the following table:

| Additive (ppm) | Stick Temp., °C. |
| --- | --- |
| Control | 30 |
| 5000 erucamide | 30 |
| 5000 stearamide | 37 |
| 5000 N,N'—ethylenebisstearamide | 30 |
| 1000 N,N'—ethylenebisoleamide | 33 |
| 3000 N,N'—ethylenebisoleamide | 33 |
| 5000 N,N'—ethylenebisoleamide | 33 |

It can be seen that in this test N,N'-ethylenebisoleamide did not raise the stick temperature as much as stearamide but was somewhat more effective than either erucamide or N,N'-ethylenebisstearamide. It will be remembered, however, that N,N'-ethylenebisoleamide migrated very fast in this polymer in the migration test described earlier in this disclosure.

EXAMPLE 14

Highly tacky polymers cannot be evaluated satisfactorily in the stick temperature test. Therefore, a blocking test was developed for evaluation of the effectiveness of anti-tack agent candidates.

A hollow metal cylinder, 7.5 cm in inside diameter and 10 cm in length, lined with poly(ethylene terephthalate) film, is placed on a thin metal plate covered with poly(ethylene terephthalate) film. The cylinder is filled with EVA copolymer pellets, and a 2050 g weight is placed on top of the pellets, resulting in a pressure of 4.3 kPa. The filled cylinder is kept at 30±2° C. for a period of 8 hours. The cylinder is then carefully slipped off the column of pellets. If the copolymer maintains the shape of the cylinder, it is said to be blocked. If the copolymer pellets fall into a pile, it is said to be free flowing.

EVA copolymer having a melt index of 57 g/10 min and a vinyl acetate content of about 40% was formulated with 1000 and 5000 ppm of each of the following:

"Kemamide" S (stearamide) and
"Kemamide" E (erucamide)

All samples were sticky (similar to wet snow). Samples containing 1000 ppm of additive blocked in the bags and were not subjected to the blocking test. Both 5000 ppm samples blocked in the test.

EXAMPLE 15

The following EVA dipolymer (40% of vinyl acetate; melt index of 57 g/10 min) samples containing the indicated level of the indicated amide were prepared via 10 or 25% amide concentrates, as described in Examples 1 and 4, and pelletized:

| Run No. | Amide Type | Concentration, ppm |
| --- | --- | --- |
| 1 | stearamide | 10000 |
| 2 | " | 15000 |
| 3 | N—oleyl-N—palmitamide | 1000 |
| 4 | " | 5000 |
| 5 | oleamide | 1000 |
| 6 | " | 5000 |
| 7 | N,N'—ethylenebisstearamide | 1000 |
| 8 | " | 5000 |
| 9 | N,N'—ethylenebisoleamide | 1000 |
| 10 | " | 5000 |
| 11 | oleamide | 1000 |
| 12 | " | 5000 |
| 13 | " | 3000 |
| 14 | N,N'—ethylenebisoleamide | 3000 |
| 15 | N,N'—ethylenebisoleamide* | 3000 |
| 16 | erucamide | 1500 |
|    | stearamide | 375 |
| 17 | N,N'—ethylenebisoleamide* | 1875 |
| 18 | N,N'—ethylenebisoleamide* | 500 |

*Prepared from a 25% concentrate in EVA copolymer having a melt index of 150 g/10 min and a vinyl acetate content of 28%.

During the preparation of the above samples, each was observed on the drying screen immediately after pellet formation for pellet flowability. The pellets made in the following runs were free-flowing:
1, 2, 9, 10, 14, 15, 17, and 18.

In the blocking test described above in Example 14, the following samples remained free-flowing:
9, 10, 14, 15 and 17.

The remaining samples blocked. A commercial sample of clay-coated EVA copolymer also blocked in this test.

EXAMPLE 16

The following EVA copolymer (28% of vinyl acetate, melt index of 150 g/10 min) samples were prepared as described in Example 15:

| Run No. | Amide Type | Concentration, ppm |
| --- | --- | --- |
| 1 | oleamide | 3000 |
| 2 | N,N'—ethylenebisoleamide* | 3000 |
| 3 | N,N'—ethylenebisoleamide | 3000 |

*Prepared from a 10% concentrate in EVA copolymer having a melt index of 400 g/10 min.

The stick temperature of the base EVA copolymer used in runs 1–3 was 30° C. The stick temperatures of the samples of runs 1–3 were as follows:

| Run | Stick Temperature, °C. |
| --- | --- |
| 1 | 29 |

-continued

| Run | Stick Temperature, °C. |
|---|---|
| 2 | 36 |
| 3 | 34 |

IT can be seen that oleamide was a poor performer in this test, while N,N'-ethylenebisoleamide was a good performer.

EXAMPLE 17

The stick temperatures of untreated pellets of a terpolymer of ethylene with n-butyl acrylate (30%) and carbon monoxide (10%) made by the general process of U.S. Pat. No. 3,780,140 to Hammer, which had a melt index of 5.0 g/10 min, as well as of pellets of the same terpolymer containing varying levels of N,N'-ethylenebisoleamide were determined as follows:

| Additive level (ppm) | Stick Temperature, °C. |
|---|---|
| — (control) | 25 |
| 1000 | 26 |
| 3000 | 29 |
| 5000 | 29 |

EXAMPLE 18

Stick temperatures of certain untreated and treated commercial ethylene/vinyl acetate copolymer pellets were determined according to the above-described method. Elvax ® is a trademark of E. I. du Pont de Nemours and Company for ethylene/vinyl acetate copolymers. The melt indices, the weight proportions of vinyl acetate in the copolymers, and the stick temperatures of the pellets are given below.

| Commercial Elvax ® Resin Designation | | MI | VA | Stick Temperature | |
|---|---|---|---|---|---|
| Untreated | Treated | | | Untreated | Treated |
| 40 P | 40 W | 57 | 40 | <24[1] | 34[2] |
| 220 | 220 W | 150 | 28 | 40 | 46[3] |
| 210 | 210 W | 400 | 28 | 34 | 40[3] |
| 150 | 150 W | 43 | 33 | 31 | 38[3] |

[1] Clay-coated
[2] 4000 ppm N,N'—ethylenebisoleamide
[3] 3000 ppm N,N'—ethylenebisoleamide

I claim:

1. A pellet of a polymer selected from the group consisting of:
   (a) copolymers of ethylene with vinyl acetate in which the amount of vinyl acetate is about 18–55 weight percent,
   (b) terpolymers of ethylene with vinyl acetate and carbon monoxide in which the amount of vinyl acetate is about 20–40 weight percent and the amount of carbon monoxide is about 3–12 weight percent,
   (c) copolymers of ethylene with methacrylic acid in which the amount of methacrylic acid is about 6–30 weight percent, the carboxyl groups of the copolymers being neutralized with zinc ions to an extent of 0 to about 50%,
   (d) copolymers of ethylene with methyl methacrylate in which the amount of methyl methacrylate is about 18–40 weight percent, and
   (e) terpolymers of ethylene with n-butyl acrylate and carbon monoxide in which the amount of n-butyl acrylate is about 20–40 weight percent, and the amount of carbon monoxide is about 3–15 weight percent;
   the stick temperature of the copolymers of paragraph (a) being at most about 40° C., and the stick temperature of the polymers of paragraphs (b) through (e) being below about 60° C.;
   said pellet having incorporated into the copolymer an effective amount from about 500 to about 10000 parts by weight per million parts by weight of the polymer (ppm) of an additive selected from the group consisting of N,N'-ethylenebisoleamide, N,N'-ethylenebiserucamide, N,N'-dioleyladipamide, and N,N'-dierucyladipamide to reduce the tackiness of the pellet;
   with the proviso that when the polymer in the pellet is a dipolymer with vinyl acetate, it may also contain blended therewith wax in an amount of up to about 13% of the copolymer weight.

2. A pellet of claim 1 wherein the polymer is a dipolymer of ethylene with vinyl acetate or terpolymer of ethylene with vinyl acetate and carbon monoxide.

3. A pellet of claim 2 wherein the additive is N,N'-ethylenebisoleamide.

4. a pellet of claim 3 wherein the polymer is a dipolymer of ethylene with vinyl acetate.

5. A pellet of claim 1 wherein the amount of the additive is 1000–5000 ppm.

6. A pellet of claim 5 wherein the amount of the additive is 2000 to 4000 ppm.

7. A pellet of claim 1 wherein the additive is N,N'-ethylenebisoleamide.

8. A pellet of claim 1 wherein the wax is paraffin wax.

9. A method of reducing the tack and blocking tendency of polymers selected from the group consisting of:
   (a) dipolymers of ethylene with vinyl acetate in which the amount of vinyl acetate is about 18–55 weight percent,
   (b) terpolymers of ethylene with vinyl acetate and carbon monoxide in which the amount of vinyl acetate is about 20–40 weight percent and the amount of carbon monoxide is about 3–12 weight percent,
   (c) copolymers of ethylene with methacrylic acid in which the amount of methacrylic acid is about 6–30 weight percent, the carboxyl group of the copolymers being neutralized with zinc ions to an extent of 0 to about 50%,
   (d) copolymers of ethylene with methyl methacrylate in which the amount of methyl methacrylate is about 18–40 weight percent, and
   (e) terpolymers of ethylene with n-butyl acrylate and carbon monoxide, in which the amount of n-butyl acrylate is about 20–40 weight percent, and the amount of carbon monoxide is about 3–15 weight percent;
   the stick temperature of the polymers of paragraph (a) being at most about 40° C., and the stick temperature of the polymers of paragraphs (b) through (e) being below about 60° C.;
   said method comprising incorporating into the polymer prior to pelletization an effective amount of about 500 to about 10000 parts by weight per million parts by weight (ppm) of an additive selected from the group consisting of N,N'-ethylenebisoleamide, N,N'-ethylenebiserucamide, N,N'-dioleyladipamide, and N,N'dierucyladipamide;

with the proviso that when the polymer in the pellet is a dipolymer with vinyl acetate, it may also contain blended therewith wax in an amount of up to about 13% of the copolymer weight.

10. The method of claim 9 wherein the amount of the additive is 1000–5000 ppm.

11. The method of claim 10 wherein the amount of the additive is 2000–4000 ppm.

12. The method of claim 9 wherein the polymer is a dipolymer of ethylene with vinyl acetate or terpolymer of ethylene with vinyl acetate and carbon monoxide, and the additive is N,N'-ethylenebisoleamide.

13. The method of claim 9 wherein the wax is paraffin wax.

14. The method of claim 12 wherein paraffin wax is present in the pellets.

* * * * *